United States Patent [19]

Baghdady

[11] 4,060,809

[45] Nov. 29, 1977

[54] TRACKING AND POSITION DETERMINATION SYSTEM

[76] Inventor: Elie J. Baghdady, 21 Overlook Drive, Weston, Mass. 02193

[21] Appl. No.: 566,195

[22] Filed: Apr. 9, 1975

[51] Int. Cl.² .......................... G01S 1/40; G01S 3/54; G01S 5/04; G08G 5/00

[52] U.S. Cl. ............................ 343/112 R; 343/106 D; 343/112 TC; 343/113 DE

[58] Field of Search ....... 343/113 DE, 106 D, 112 R, 343/108 M

[56] References Cited

U.S. PATENT DOCUMENTS

| | | | |
|---|---|---|---|
| 2,490,050 | 12/1949 | Hansel | 343/106 D X |
| 3,094,697 | 6/1963 | Kramar et al. | 343/106 D |
| 3,133,283 | 5/1964 | Ghose | 343/113 R |
| 3,438,036 | 4/1969 | Bennett | 343/113 DE |
| 3,781,880 | 12/1973 | Jacobson | 343/106 D |
| 3,798,648 | 3/1974 | Lammers | 343/113 DE |

Primary Examiner—T.H. Tubbesing
Assistant Examiner—Richard E. Berger
Attorney, Agent, or Firm—Burns, Doane, Swecker & Mathis

[57] ABSTRACT

A method and apparatus for tracking and position determination includes generating carrier waves in transmitters; radiating said carrier waves; receiving said radiated carrier waves; imparting or simulating a motion, or motions, to radiators, reflectors or/and receiving antennas, within the locality of each, in such a way as to induce direction-dependent frequency modulation in each signal delivered to the receiving detectors; detecting said modulation on each received signal; and using measured parameters of said detected modulation to track the location of one or more of the said transmitters, reflectors or/and receivers and determine the corresponding position coordinates thereof. The actual or simulated motion of the radiators reflectors or antennas may have a uniform velocity along at least two straight, non-parallel lines.

43 Claims, 6 Drawing Figures

TRACKING AND POSITION DETERMINATION SYSTEM

This invention relates to electronic tracking and position determination methods and apparatus and more particularly to such a tracking and position determination method and system based entirely on frequency measurements on one-way propagated signals for computing spherical and/or rectangular coordinates of one position relative to another.

A number of tracking and position determination systems have been described in the patent literature.

Tracking and position determination systems known in the art to-date have been based mostly on coherent measurement of transit-time or phase-shift of a signal traversing the distance between the tracking equipment and the tracked object or, as in interferometer systems, between two ends of a baseline of known length. Other tracking and position location techniques known in the art based on frequency measurements utilize coherent measurements of doppler shift caused by the relative motion between the tracking equipment and the tracked object.

More specifically, techniques known in the art to-date for determining position coordinates (spherical and/or rectangular) and velocity and acceleration vectors employ triangulation and/or trilateration based on direction cosine, distance (or range) and range rate data obtained by means of a variety of tracking equipment, including optical equipment (cinetheodolites, telescopes), ground-based radar with highly directive antenna beams or operating on the monopulse principles, and radio interferometer techniques (AME, Minitrack, etc.)

While many advantages can be cited for each of these prior art techniques, some important disadvantages are also known that limit their performance capabilities in a number of important applications. For example, the achievable acquisition (spatial and phase) and lock characteristics, accuracy and flexibility of these systems are well below the requirements for tracking the new-generation, high-performance vehicles flying at relatively low-to-moderate altitudes, including single and multiple-target missions and air traffic flow surveillance.

The operational and measurement capabilities of optical tracking and position determination systems, are inadequate to permit real-time surveillance of air traffic, or real-time evaluations of many of the missile and target systems to be tested at missile ranges. Adverse weather and visibility conditions can also seriously degrade optical measurement system performance.

Radio tracking and position determination systems known in the art are based on multi-site angle, range, range-difference, range-sum and range rate measurements requiring target-generated beacon signals or target-borne transponders. These systems provide the desired data by coherent measurement of phase relative to some local reference, phase differences, elapsed or transit time and analog-variant Doppler shift associated with relative motion between target and tracking equipment. Systems dependent on highly directive antennas (pattern peaks or nulls) are further limited by the requirements for spatial search, acquisition and maintenance of signal at a fixed point on the main lobe.

Although certain advantages may be claimed for the prior art systems that are based on measurements of phase, phase-difference or transit-time between the tracked object and the tracking station, several disadvantages are common to them all resulting from: (a) the requirement for maintaining strict phase coherence throughout the system; (b) the sensitivity of phase to additive disturbances and atmospheric refractive instabilities; (c) the requirement for two-way propagation of the tracking signal (from a tracking station to the tracked object and back to the same or another tracking station) in non-interferometer and non-monopulse systems to maintain the high degree of coherence necessary for accurate measurements; and, (d) the fact that the measured phase information is completely determined by a complex combination of a variety of non-deterministic factors.

The present invention comtemplates overcoming these disadvantages by eliminating the necessity for measuring relative phase or (non-infinitesimal) phase difference or propagation time, and by basing the tracking operation entirely on frequency measurements.

A number of systems are known in the art which derive tracking information from doppler frequency shifts caused by relative motion between the tracked object and the tracking station (or stations).

Although systems, based on measurement of doppler shift caused by relative motion between the tracked object and the tracking station have the basic advantages of dependence on frequency rather than phase measurement, they nevertheless are subject to important disadvantages resulting from the following facts: (a) the relative motions that cause the doppler shifts are not known or pre-programmed precisely in advance in the tracking system; (b) range information can be determined from the measured doppler only by integration, which raises the problem of establishing an initial value for each (incremental) range measurement (the so-called "initialization" problem, well known in the art); and (c) accurate doppler measurement requires the maintainance of full coherence throughout the system, and hence two-way propagation of the tracking signal (from a tracking station to the tracked object and back to the same or another tracking station) unless an ultra-stable clock is used on-board the tracked object.

It is an object of this invention to provide a system for the determination of the spherical and/or rectangular coordinates of one or more points relative to a reference coordinate system on the basis of nocoherent measurements of directionally characterized frequency modulations induced entirely by prespecified motions, actual or simulated, of a radiating or a receiving antenna either within the tracking station or on the tracked object.

It is a further object of this invention to provide a means for obtaining accurate tracking and position determination information based entirely on measurements of parameters of one-way propagated signals originating in relatively inexpensive ordinary (as distinguished from ultra-stable) oscillators.

The well-known interferometer and monopulse tracking principles have been extensively applied in the art for deriving tracking and position determination information based entirely on one-way propagated signals. Specifically, the so-called AME (Angle Measuring Equipment) uses the interferometer technique to measure direction cosines of radial angles of incidence by means of a baseline made up of a number of precisely spaced antenna pairs. Each AME station consists of two perpendicular bisecting baselines, each having antennas with spacings, for example, of 128, 20, 16.5 and 16 wavelengths. Ambiguous data from four antenna pairs are combined in a computer to extract an unambiguous measurement of the radial angle of arrival of the target signal. The antenna pairs are selected to correspond to effective separations of 128 λ, 16 λ, 4 λ, 0.5 λ. The 128 λ separation provides the desired precision, and the 16 λ, 4 λ, and 0.5 λ separations are for ambiguity resolution.

The performance of the AME is dependent strongly on interferometer geometric and phase measurement characteristics, and hence is limited by a combination of inherent error mechanisms that are associated with i. The special assumptions and consequences of the interferometer technique;
ii. The fact that each unambiguous radial angle measurement only locates the target on the surface of a cone, which causes considerable GDOP (geometric dilution of precision) in the ultimate determination of the target position;
iii. The special requirements of phase measurement;
iv. The conflict between the prerequisites of high phase resolution and unambiguous identification of the result;
v. The vulnerability of the measured phase difference to the uncertainties of the electrical path length of the interferometer baseline; and
vi. The sensitivity of phase to various disturbances, independent noise and multipath in the propagation medium and in the receiver.

Specifically, the error sources that beset the capability for tracking and position determination on the basis of phase shift measurements, such as is done with AME, and more generally with interferometers based on phase-lag measurements, and with range or distance measuring equipment (DME), are:

a. Phase is a parameter that is generally subject to zero-shift and random-walk errors that cannot be averaged out.
b. The phase difference measured in the interferometer operation is that between the signals received by the separate antennas after these signals have been processed by separate receiver circuits which in turn are normally subject to diverse misalignments, drifts and non-uniformities and/or nonlinearities of response.
c. Phase is highly vulnerable to multipath and other propagation anomalies (reflections, rocket-exhaust plume disturbances, discontinuities in the surrounding ground plane, etc.)
d. The high-g take-off and sharp maneuvers of high-performance vehicles introduce considerable errors in phase-locked loop responses.
e. The phase-difference measured in interferometer systems is strongly affected by uncertainty in electrical path length of the baseline caused by time-variant atmospheric-refraction fluctuations.

The accuracy of the measured phase difference is degraded by decorrelation of uncertainties in the phase of the wave-front over the projection of the baseline on the nominal path traversed by the wavefront, again due to random atmospheric-refraction fluctuations.

g. Geometry of a baseline relative to the target range complicates the relation of measured phase difference to the direction cosine of the radial to the target inasmuch as the assumption of parallelism of lines connecting the extremities of the baseline to the target is fundamental to the basic direction cosine formula used.

h. Truncation errors are introduced in interferometer calculations because of the mathematical relations and the approximations assumed therein and therewith for computing the metric information from the measured data.
i. The ambiguity resolution requirement inevitably adds one more significant error source, or catastrophic failure mechanism.

It is an object of this invention to provide a means for obtaining tracking and position location information relating to a distant object by measurements of frequency modulation parameters that are essentially free from the difficulties and limitations of coherent phase-measuring or transit-time measuring techniques.

It is a further object of this invention to provide a means for obtaining tracking and position location information relating to a distant object by utilizing completely self-referencing and non-ambiguous induced frequency shifts of the tracking signal.

It is yet a further object of this invention to provide a means for directly locating the locus of the target position on a radial line (rather than on a cone) from angle measurements at a single station. In this way, measurements from only two stations (rather than three) will be sufficient for determining the $(x, y, z)$ or $(\rho, \theta, \alpha)$ coordinates of the target position.

Among the foremost considerations in the evaluation of tracking systems and position location systems for air traffic surveillance, for near-launch flight surveillance/range safety and for metric tracking down to very low altitudes are:

a. Achievable resolution and accuracy of the measurements performed;
b. Speed of spatial target acquisition by the tracking antenna, and of signal acquisition and maintenance of lock to the signal by the measurement subsystem;
c. Low-altitude performance capability and performance sensitivity to multipath;
d. Performance capability in the determination of the z-coordinate (or altitude above the ground) of target position;
e. Performance capability in the determination of the target velocity vector;
f. The blurring or dilution of precision caused by the mathematical operations through which the desired position or motion parameters are derived from the measured data;
g. Multiple target (salvo firings and other) tracking capability;
h. Characteristics of required target-borne beacon or transponder with emphasis on complexity, cost, inherent instability of internal delay characteristics and compatibility--or potential commonality or use--with other non-tracking functions;
i. Cost of system development, cost of system acquisition and reduction to operational status, and recurring cost of system operation and maintenance.

Prior art techniques for determining the position of a vehicle or an aircraft by cooperative tracking techniques (as opposed to tracking based entirely on skin-reflected return radar or optical signals from the tracked object) require relatively costly equipment onboard the tracked or navigating object, such as a transponder or an onboard interrogator of transponders positioned at reference stations, or an onboard VOR or TACAN receiver, or a relatively expensive ultra-stable (atomic or other) clock for one-way measurements.

It is a further object of this invention to provide a system that provides the tracking and position location information by means only of a relatively inexpensive radio beacon on an aircraft to enable pilot and ground controllers to determine exactly where the craft is and its velocity vector.

Throughout this disclosure, and in the appended claims, the term "induced directional frequency modulation," abbreviated "IDFM," will be employed to designate direction-dependent frequency modulation of a received signal that is artificially and deliberately induced by pre-planned and accurately pre-specified motions, real or simulated, of a transmitting antenna (or source) or a receiving antenna (or receiver) within "the confines" of a tracking station or a tracking or a tracked object, as distinguished from relative motion between the tracking and the tracked objects which changes their separation and which is normally created as a result of a purpose or a mission plan or a function not primarily concerned with facilitating the tracking or position determination function.

It is a further object of this invention to provide a system based on measurements of modulation characteristics of induced directional frequency modulation (henceforth, IDFM) that contemplates tailoring the tracking performance capability so that the greatest potential of simultaneous superiority over the prior art systems is achieved in all of the above criteria for such important applications as air traffic and general aviation surveillance and nagivation aid, and for high accuracy single and multiple object tracking and position determination at arbitrary altitudes over the surface.

It is a further object of this invention to provide a means for determining the pitch and yaw of a cylindrically shaped flying vehicle, such as a missile or an aircraft, in real time, by radio means. No prior art methods are known for pitch and yaw determination in real time by radio (non-optical) means.

It is yet a further object of this invention to provide an effective means for determining the separation vector between two flying objects in real time, relative to a reference three-dimensional coordinate system on either of the said objects.

For a better understanding of the invention together with other and further objects thereof, reference is made to the following description taken in conjunction with the accompanying drawings, wherein.

Throughout this disclosure, and in the appended claims, the terms "line of motion," abbreviated LOM, and "path of motion," abbreviated POM, will be employed to designate, respectively, a line of fixed length and a curve of specified shape, open or closed, along all or part of which an antenna is moved in some manner to induce direction-dependent frequency modulation in a signal that is either radiated by the moving antenna or received by it.

Figure 1:
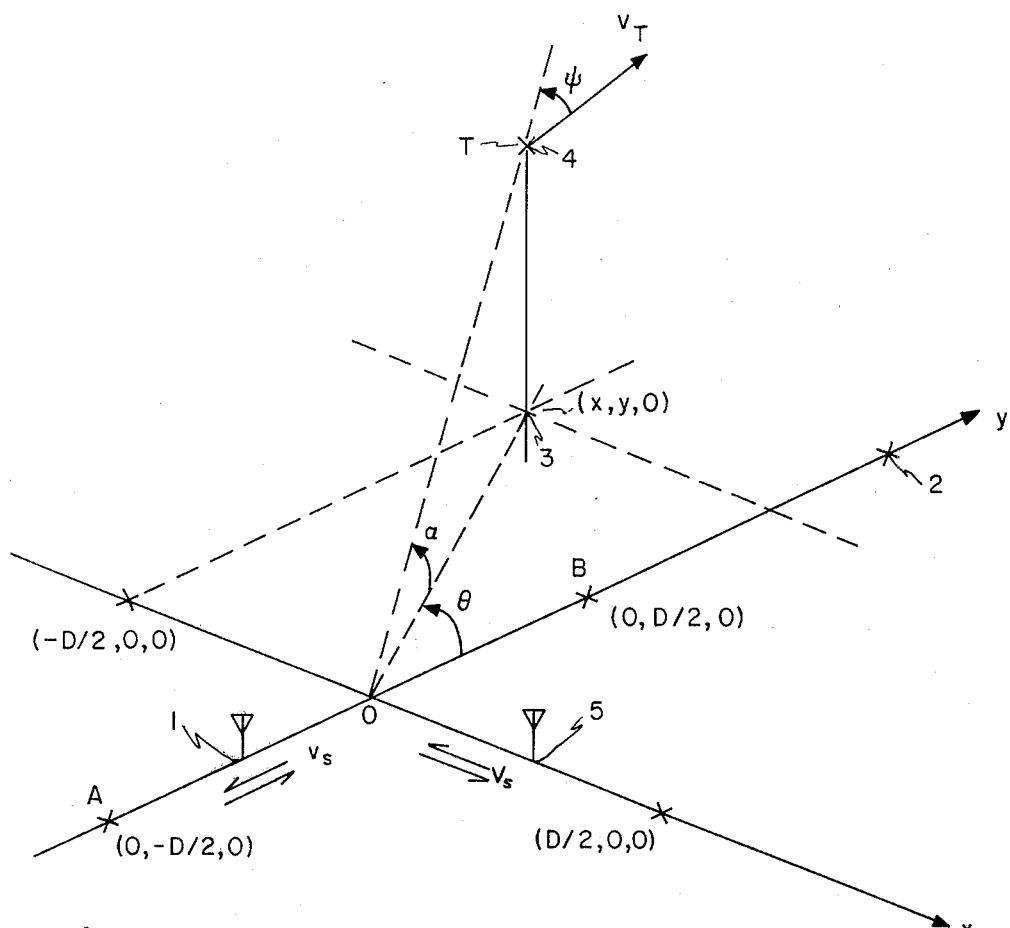
FIG. 1 shows a geometrical configuration of two crossed antenna lines of motion for a single tracking station in accordance with this invention, and the position of a distant target whose azimuth and elevation angles are to be determined relative to the tracking station.

Referring specifically to FIG. 1, consider an omnidirectional receiving antenna at 1 and a radiator of a single-frequency, constant-amplitude signal located at point 2. If the receiving antenna 1 is moved at a uniform velocity, $V_s$ meters/sec, along a straight line A-B, say, toward the distant stationary radiator at 2 positioned on an extension of the same line A-B, then the frequency of the signal received by the moving antenna 1 will be very nearly $f_o(1 + v_s/c)$, where $f_o$ is the frequency of the signal at the source and $c$ is the velocity of propagation. If the sense of the receiving antenna 1 motion is next abruptly reversed, the received frequency will jump abruptly to $f_o(1 - v_s/c)$.

Thus, a stationary source 2 radiating a frequency $f_o$Hz, when received by a remote antenna 1 (or receiver) that moves through a distant D meters at a uniform velocity $v_s$ meters/sec back and forth exactly toward and away from the source 2, will appear to have at the position of the receiver 1 a square-wave frequency modulation, performing frequency jumps of $\pm(v_s/c)f_o$Hz about $f_o$Hz, with a dwell time of $D/v_s$ sec at each value of frequency.

If the receiver 1 continues to move as described, but the source 2 moves to a new position 3 along a line 0-3 that makes an angle $\theta$ with the line traversed by the moving receiver 1, the frequency jumps perceived by the receiver 1 will now be $\pm(v_s/c)f_o \cos\theta$. A second receiver 5 moving back and forth a distance D meters at $v_s$ meters/sec along a line at right angles to the first, will receive a square-wave FM with frequency jumps of $\pm(v_s/c)f_o \sin\theta$. Thus, precise measurements of the frequency jumps for both receivers 1 and 5 will yield quantities (voltages) proportional to $\cos\theta$ and $\sin\theta$. These can be combined to yield a precise measurement or indication of $\theta$ which, with additional information obtained separately regarding the spatial quadrant in which the target is, can range unambiguously from 0° to 360°.

Of course only one of the above receivers 1 or 5 is really necessary to determine $\theta$. But when the observer views a source along a line that is nearly at right angles to the line of motion of the receiver, the frequency jumps will be very small and the accuracy of the measurement will be degraded. Indeed, the larger the value of the frequency jump to be measured, the more accurately and precisely the measurement of the jump, and hence the determination of $\theta$, will be. If more than one receiver are used, each tracing a line at a significantly different (and precisely known) orientation from the others, there will always be available to the observer a signal that will execute frequency jumps of magnitude sufficent for ensuring the desired precision in the measurement of $\theta$. A labeling doctrine may be used to identify uniquely the different lines traversed by the moving receiving antennas; e.g., by allocating a different receiver to each line, or by down-converting the signal received by each moving antenna to a different IF frequency, or by assigning different LOM lengths or values of linear velocity $v_s$, to various antennas. LOM length and velocity of linear back and forth traversals of a line determine the period (or fundamental frequency) of the square-wave frequency modulation.

Figure 2:
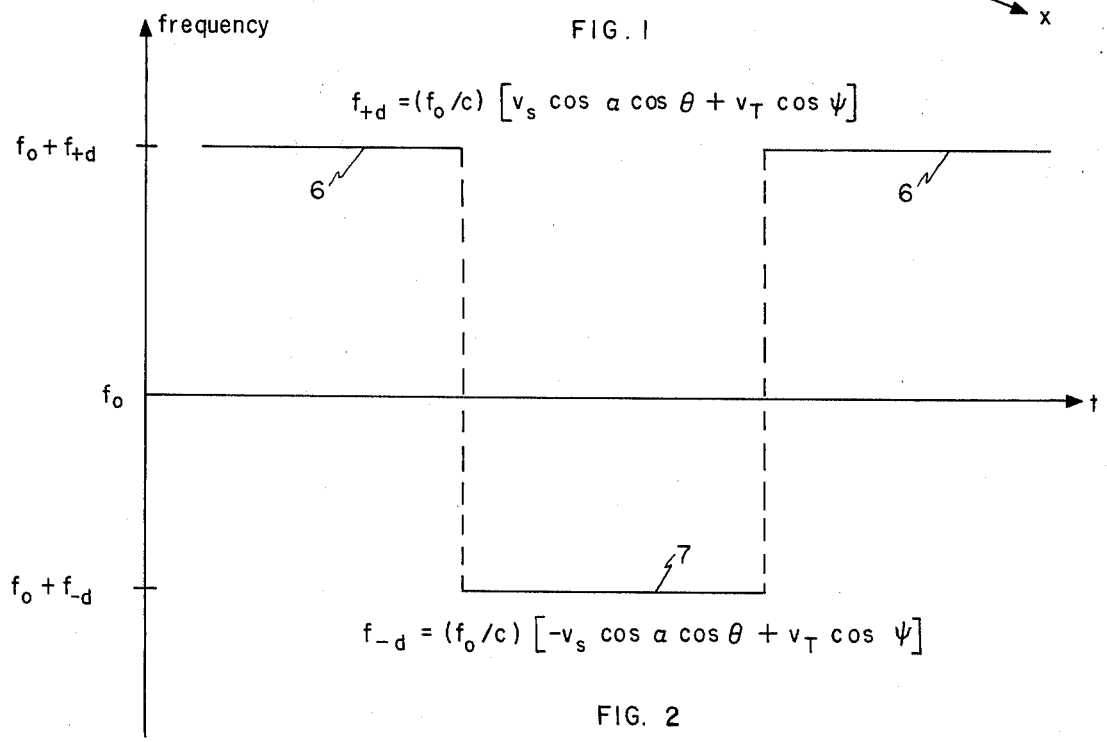
FIG. 2 shows a waveform illustrating the time and direction dependence of the received signal frequency shifts as received by a distant receiver in accordance with this invention.

With reference again to FIG. 1, if the position of the radiator is now moved to point 4 on the radial 0-T making the azimuth angle $\theta$ and elevation angle $\alpha$, then the frequency jumps induced in the signal received by the moving antenna 1 will be $\pm(v_s/c)f_o \cos\theta \cos\alpha$, and those for the moving antenna 5 will be $\pm(v_s/c)f_o \sin\theta \cos\alpha$. If, in addition, the radiating source 4 moves with a velocity vector $v_T$ at angle $\psi$ relative to the radial 0-T, then the frequency jumps perceived by the moving receiving antenna 1 will, for constant $v_T \cos\psi$, be as shown in FIG. 2, lines 6 and 7.

The preceding discussion is a simplified description of the IDFM tracking technique. The same results will be obtained if the antenna that is moved back and forth with uniform speed along a straight line is used to radiate a single-frequency $(f_o Hz)$ signal which is then received at a distant position.

FIG. 1 illustrates the principles of IDFM tracking by a single station for a target vehicle in arbitrary motion above the plane of two non-parallel lines of motion (LOM) that are traversed at uniform speeds by (receiving or transmitting) antennas. In such a general case, FIG. 2 illustrates the observable frequency jumps and the expressions for positive and negative frequency shifts in terms of the parameters defined in FIG. 1.

Throughout this disclosure and in the appended claims, the abbreviation "IDFM/R" will be employed to designate the case wherein the IDFM is generated by moving the receiving antenna, and the abbreviation "IDFM/T" will be employed to designate the case wherein the IDFM is generated by moving the transmitting antenna.

The rectilinear motion described above for the receiving or transmitting antenna can be simulated by successively commutating or connecting the input of one fixed receiver (for receiving) or the output of one fixed transmitter (for radiating) to discrete stationary antennas arranged in a straight line of the desired length and orientation. For a given desired length of line and linear speed of traversal, the number of discrete antennas to use and the manner of switching antennas on or off (i.e., the blending function) can be determined readily by first recognizing the process of simulation of antenna motion by successive energization of discrete, stationary antenna elements as a process of discrete sampling of the motion.

Figure 3:
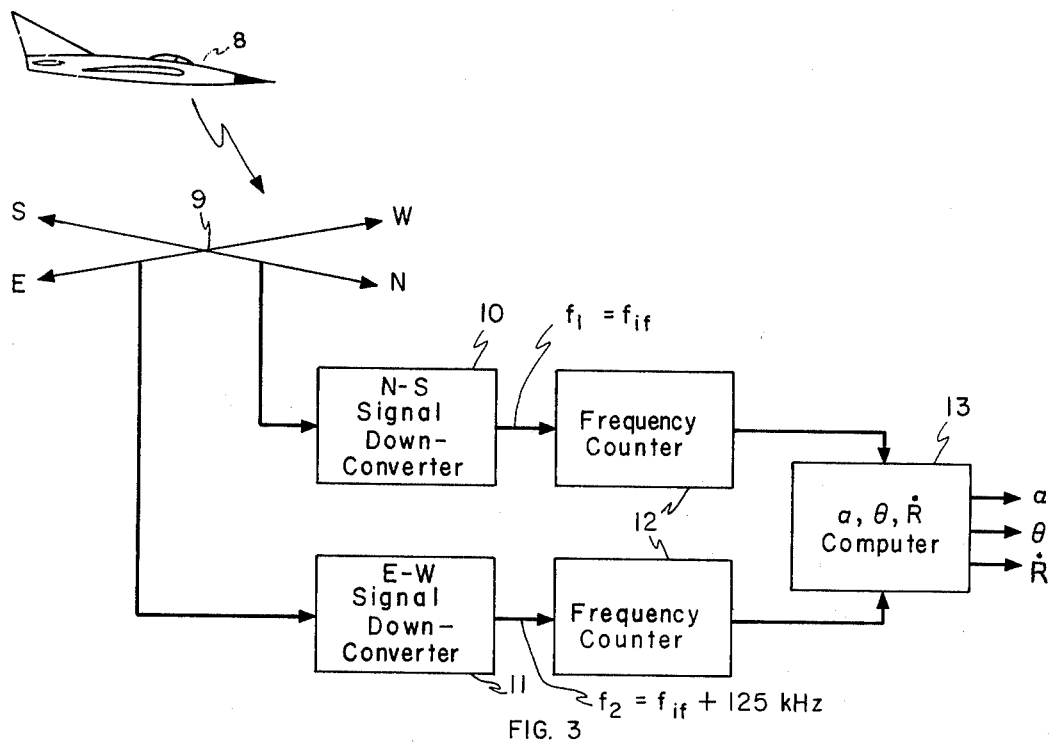
FIG. 3 is a block diagram of one form of a tracking and position determination system in accordance with this invention, including a beacon transmitter and one form of receiving and indicating scheme for deriving the azimuth and elevation angles of the radial to the beacon transmitter from the signal emitted by the transmitter.

For purposes of illustration of how the IDFM techniques can be employed in a specific application consider first the situation illustrated in FIG. 3. FIG. 3 shows a target 8 that carries an onboard, low-power beacon transmitter. The beacon provides a CW fixed-frequency $(f_o)$ signal for an IDFM/R system 9 for measuring the target elevation and azimuth direction angles relative to the plane 9 of the LOM's. The part of the IDFM/R system on the ground plane consists of two crossed rectilinear arrangements E-W and N-S of sequentially activated receiving antenna elements. Each antenna element is connected momentarily, in succession, to one down-converter (10 and 11) for each line of antennas. The down-converters 10 and 11 translate the frequencies received by the elements of each sequence to subchannel intermediate frequencies $f_1$ and $f_2$. The subchannel frequencies thus distinguish the receiving antenna sequences, and they are processed by the IDFM receiver to provide measurements of the received frequencies in the frequency counters 12. The data so obtained are then used in 13 to compute the azimuth, $\theta$, and elevation angle, $\alpha$, of the radial to the target relative to the plane of the crossed antenna lines; and the range rate R of the moving vehicle.

Figure 4:
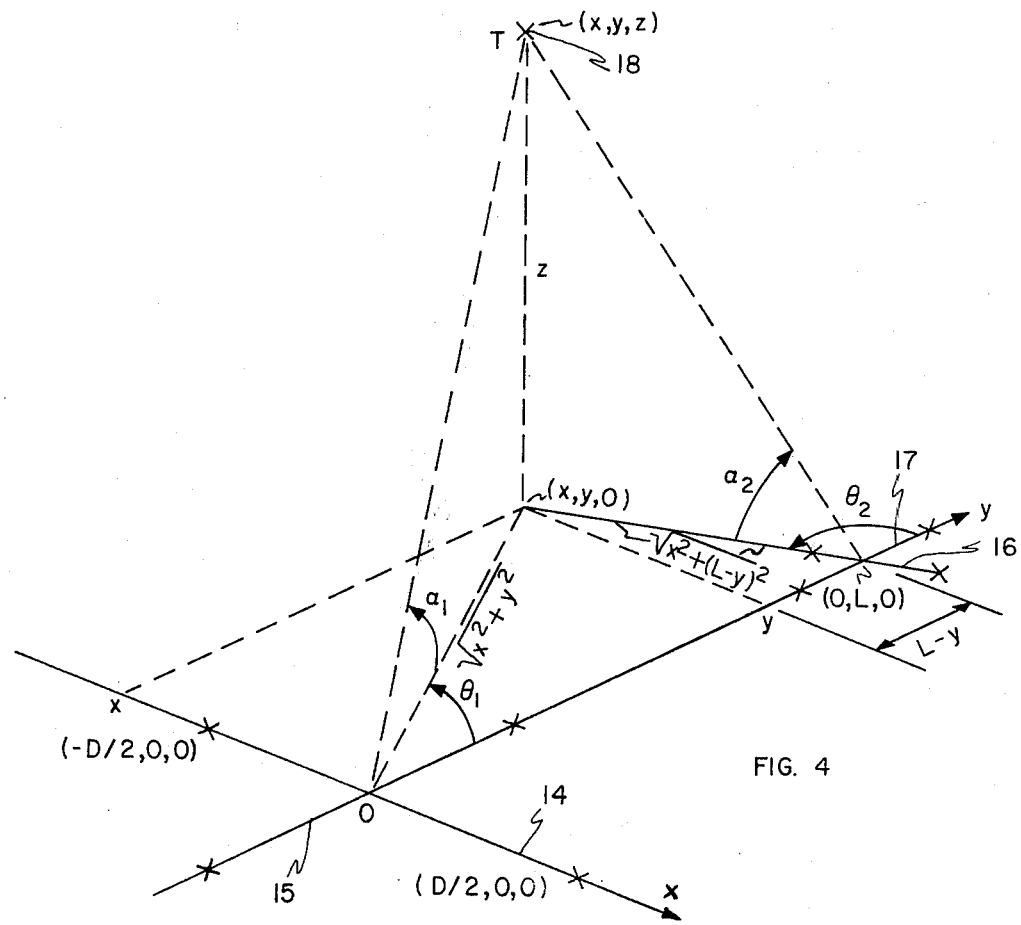
FIG. 4 shows a geometrical configuration of two spaced tracking stations each utilizing two crossed antenna lines of motion in accordance with this invention, and the position of a distant target whose coordinates are to be determined relative to one of the tracking stations.

The measured frequency values at a single station enable the computation only of azimuth, $\theta$, elevation angle, $\alpha$, and range rate R relative to the station. The azimuth $\theta$ determines the target position to fall in a plane orthogonal to the plane of the station LOM's; the elevation angle $\alpha$ determines the target position to fall on one of two radial lines above the plane of the LOM's, one of which lines can then be ruled out from a priori considerations. Reference now to FIG. 4 shows how two target position radials determined each relative to one of two stations (14, 15) and (16, 17), spaced a known distance, L, apart, determine at their point of intersection 18 the unambiguous location of a signal-radiating target, T. Thus, range, R, and (x, y, z)-position coordinates can be determined from two-station data; and target vector velocity from three-station data.

Specifically, if the peak-to-peak frequency jump due to the real or simulated motion of the IDFM antenna is denoted $$f_{cd} = f_{+d, c} - f_{-d, c}$$

for the cosine (or N-S) sequence and $$f_{sd} = f_{+d, s} - f_{-d, s}$$

for the sine (or E-W) sequence then, for each separate tracking station, $$\tan\theta = f_{sd}/f_{cd}$$

$$\cos\alpha = \frac{\lambda_o}{2v_s} \sqrt{f_{cd}^2 + f_{sd}^2}, \lambda_o = \frac{f_o}{c}$$

and

Range Rate = $R_{OT}$ $$= \frac{1}{4} \left(\frac{c}{f_o}\right) [f_{+d,c} + f_{+d,s} + f_{-d,c} + f_{-d,s}]$$

= average of four separate determinations

Two stations only (see FIG. 4) are necessary for the determination of slant range and of (x, y, z)-coordinates, with a check on the computed value of z provided by two separate determinations of it, one relative to each station. The results can be expressed as follows:

For the slant range, $R_{OT}$:

$$R_{OT} = 2v_s \left(\frac{L}{\lambda_o}\right) \frac{f_{cd1}f_{cd2}f_{sd1}}{(f_{sd1}f_{cd2})^2 + (f_{cd1}f_{sd2})^2}$$

For the $x$ and $y$ coordinates:

$$x = L \frac{f_{sd1} f_{sd2}}{f_{sd1} f_{cd2} + f_{sd2} f_{cd1}}$$

$$y = L \frac{f_{sd2} f_{cd1}}{f_{sd1} f_{cd2} + f_{sd2} f_{cd1}}$$

Finally, the $z$-coordinate is given by $$z = L \frac{f_{sd2} \sqrt{f_{cd1}^2 + f_{sd1}^2}}{f_{sd1} f_{cd2} + f_{sd2} f_{cd1}} \cdot \frac{f_{sd1}}{f_{cd1}}$$

or by $$z = L \frac{f_{sd1} \sqrt{f_{cd2}^2 + f_{sd2}^2}}{f_{sd1} f_{cd2} + f_{sd2} f_{cd1}} \cdot \frac{f_{sd2}}{f_{cd2}}$$

or by the average of the two expressions; namely, $$z = \frac{f_{sd1} f_{sd2} \frac{L}{2}}{f_{sd1} f_{cd2} + f_{sd2} f_{cd1}} \cdot \left[ \sqrt{1 + (\frac{f_{sd1}}{f_{cd1}})^2} + \sqrt{1 + (\frac{f_{sd2}}{f_{cd2}})^2} \right]$$

Three stations enable the determination of target vector velocity and provide six separate determinations of the $z$-coordinate, which when combined provides sixth-order overdetermination diversity benefits for the reliable and accurate determination of the $z$-coordinate. The three-station data also provide three independent determinations of the $x$ and $y$ coordinates, and at least four independent determinations of range rate relative to each station. (Additional range rate measurements can also be made by means of continuous reception with fixed antenna elements.)

The results for the vector velocity components along the $x$, $y$, and $z$ axes are:

$$v_{Tx} = \frac{1}{8} \frac{\lambda_o^2}{v_s} \sum_{n=1}^{3} f_{sdn}(f_{+d,cn} + f_{+d,sn} + f_{-d,cn} + f_{-d,sn})$$

$$v_{Ty} = \frac{1}{8} \frac{\lambda_o^2}{v_s} \sum_{n=1}^{3} f_{cdn}(f_{+d,cn} + f_{+d,sn} + f_{-d,cn} + f_{-d,sn})$$

$$v_{Tz} = \frac{1}{4} \lambda_o \sum_{n=1}^{3} (f_{+d,cn} + f_{+d,sn} + f_{-d,cn} + f_{-d,sn}) \times$$

$$\sqrt{1 - (\frac{\lambda_o^2}{2v_s})^2 (f_{cdn}^2 + f_{sdn}^2)}$$

From the $x$, $y$, and $z$ components of the vector velocity ($v_T, \beta, \gamma$) we can determine its spherical parameters $v_T$, $\beta$, and $\gamma$, obtaining $$v_T = \sqrt{v_{Tx}^2 + v_{Ty}^2 + v_{Tz}^2}$$

$$\beta = \tan^{-1} \frac{v_{Tx}}{v_{Ty}}$$

$$\gamma = \tan^{-1} \frac{v_{Tz}}{\sqrt{v_{Tx}^2 + v_{Ty}^2}}$$

The IDFM/R or IDFM/T techniques can be based entirely on omni-directional antennas, which eliminates the spatial acquisition problem, and on the measurement of frequencies that vary with time in a digital manner with potential total immunity to source instabilities and to multipath and with no basic requirement for very narrowband phase lock.

Computations show that with a "beacon" effective radiated power of one watt, and antenna elements in a commutated sequence, each characterized by an omni-directional pattern, a system accuracy in terms of a few feet in position, few ft/sec in velocity and one part in $10^4$ in doppler shift, can be maintained out to over 100 km in range and 3 km/sec in range rate, based on receiving noise bandwidths in the hundreds of Hz.

It can be seen from the preceding discussion that unlike other known all-doppler frequency-measuring tracking systems, the frequency shifts used for deriving the tracking data with IDFM are not those caused by relative motion between transmitter and receiver as an inevitable result of either or both being carried by a moving vehicle enroute to a destination or in a holding pattern, but rather by a deliberate pattern of superimposed motion (actual or simulated) or an antenna on the platform carrying it. The result of this novel concept is that an all-frequency tracking technique is used to derive total distance data rather than incremental changes in distance (or differential distance) data. Consequently, the "initialization" problem of the conventional all-doppler tracking techniques is nonexistent with IDFM, and the calculations of position and motion parameters are based on simple arithmetic operations on the measured data.

The IDFM technique is well-suited to many tracking applications, including metric as well as flight surveillance requirements. The practical implementation for these purposes can follow one of three approaches.

a. IDFM/T WITH TARGET-BORNE TRANSPONDER

In this approach, the IDFM is generated by moving the transmitting antenna, and an onboard uplink receiver is employed in the target that translates frequency down to a telemetry subchannel to be returned via a telemetry link for all measurements and data handling to be performed at the IDFM/T source station or at some other central data facility. If no uplink receiver is onboard, then a special transponder may be used. In either case, the returned signal is subject to the sum of an uplink doppler that combines doppler shifts caused by the ground antenna speed $v_s$ and target range rate $R_{OT}$ plus downlink doppler associated with $R_{OT}$. This will introduce an error in the computed parameters of the target vector velocity due to the transit time of the signal going up and back down.

b. IDFM/T WITH ONBOARD-TARGET FREQUENCY MEASUREMENT

In this approach, a full onboard IDFM signal receiver that performs the frequency measurements is employed, and the results of the measurements are relayed to the IDFM/T source station via a telemetry link.

c. IDFM/R

In this approach, the tracking antenna system is operated in an IDFM receive mode to receive a carrier signal from each target (with different frequencies to distinguish different targets). Preferably, the carrier signal should be a special signal for the purpose. However, a telemetry signal may be used, provided a usable spectral line can be extracted from it in a consistent manner. Such a line may be i. A carrier component that can be separated from the spectrum of a modulated signal (a $\phi$M or FM signal with a low modulation index); or ii. A carrier that can be synthesized from the spectrum of a modulated signal (e.g., a phase-reversal modulated signal).

All of the above approaches are suited to both metric and flight surveillance tracking as well as to multiple target tracking. In approaches (a) and (b), different targets can be distinguished first by different turn-around or donwlink frequencies, and additionally, if desired, by some subcarrier frequency or identifying code selection. In certain multiple-target situations (e.g., multiple drone missions), it may be desirable to designate one of the targets as a Master or Central vehicle that receives over relatively low-power links the downlink responses of all other vehicles, multiplexes them and retransmits them to ground over a telemetry link. In air traffic surveillance applications, different targets can also be separated on the basis of the different IDFM/R frequency shifts associated with different directions from the station to each target, even though the same beacon frequency is radiated simultaneously by more than one of these targets.

Pitch and yaw of a cylindrically shaped flying object, such as a missile, or an aircraft, can also be determined by applying the techniques of this invention. The pitch and yaw are determined by the orientation vector of the cylindrical axis of the vehicle (e.g., missile or aircraft).

The orientation vector of the cylindrical axis of a vehicle relative to the motion vector of the vehicle (the so-called angle of attack) can be determined by determining:

a. The orientation vector of the cylindrical axis of the vehicle relative to a fixed ground coordinate system; and b. The velocity vector of the vehicle.

The roll of a vehicle about its cylindrical axis can be determined from the amplitude modulation of the signal received on the ground from a radiator on the fuselage.

Throughout this disclosure, and in the appended claims, the term "AXORD" will be used in reference to a combined system for axial orientation and roll determination, a specific embodiment of which is described herein for illustrative purposes only, and not as the only way in which this invention can be employed in implementing an AXORD system.

In a specific AXORD implementation, one may install one or more lines of discrete antenna elements parallel to the cylindrical axis of the vehicle. If two lines are installed, they should be on opposite ends of a cross-sectional diameter; if three lines, they are best placed on the ends of radii spaced 120° apart; and so on.

The antenna elements can be printed flush on the outer skin employing strip-line techniques, for example, or they may consist of slots or stubs where this is allowed structurally in the vehicle aerodynamic profile.

A transmitter with a solid-state switching or commutation system is connected sequentially to the antenna elements in each line. In the simplest form, the antenna elements can be lined up along cross-sectional circumferences, with the elements along each circumference being energized simultaneously in exact phase. If it is desired to distinguish between the various antenna sequences, or lines of motion, this can be done by using a different frequency for each line, or by coded interconnections of two or more elements on various parts of the lines.

Reception of the transmitted signal by a ground station employing an IDFM receiver enables the determination of the angular orientation of the radial from the ground station to the vehicle relative to the cylindrical axis of the vehicle. IDFM reception at three such ground stations suitably deployed enables the complete determination of the orientation vector of the cylindrical axis of the missile relative to the fixed reference coordinate system of the ground stations.

As the missile rolls about its cylindrical axis, an amplitude modulation will result on the signal received by each ground station. If one or more of the onboard antenna sequences is distinguished by special interconnections among certain of its antenna elements, the detection of the amplitude modulation of the signal received from that particular sequence is facilitated. The detection of the AM effect can also be facilitated by deliberately radiating at a different level from each of the antenna sequences.

Finally, as shown earlier in this disclosure, the data measured by the three ground IDFM receivers can be combined in "real time" to determine the "instantaneous" velocity vector of the vehicle, which when combined with the data describing the axial orientation vector yields the angle of attack of the vehicle.

The techniques of this invention can also be applied to implement systems for on-board measurement of separation vectors between two or more objects (e.g., aircraft in a traffic pattern, or in a flight formation) or for measuring the miss-distance vector and angle of approach of a weapon fired against a target.

In addition to performance reliability and accuracy, a major consideration in relative separation or miss-distance vector measurement instrumentation is cost and quick-look or real-time availability of the results. The IDFM techniques of this invention provide novel, low-cost systems to perform multi-parameter measurements of miss-distance and other target approach and weapon miss-characteristics with the capability for real-time display of the data, including not only the distance of closest approach, but also such other factors (for a multi-dimensional analysis of the fire control or target interception problem) as velocity of closure on, or separation from, the target, the direction of interceptor approach to the target (or angle of the miss-distance) and orientation of the reference plane of the target relative to the miss-distance vector.

The techniques in use at present for measuring vehicle attitude, attitude rate and miss-distance employ ground-based optical equipment (cinetheodolites, telescopes), ground-based radar, vehicle-borne inertial equipment (stable platforms, accelerometer installations), and the targetborne (quick-look) scalar miss-distance AN/USQ-11 radar. The achievable accuracy and flexibility of these systems are well below the requirements for the new-generation, high-performance vehicles, and the time required to process data has caused the data to be sometimes unavailable prior to succeeding tests.

Missile attitude is typically determined by analysis of the missile image from photographic films and plates. By taking advantage of data smoothing and the physical limits on vehicle dynamics, attitude for altitudes below 60,000 feet can be determined to within 1° to 10° for pitch and yaw and ±36° to 90° for roll. Vector miss-distance can be measured optically with a scalar accuracy of 3 to 30 feet. Electronically, with the AN/USQ-11, scalar miss-distance accuracies of 10 to 100 feet are provided. The angle of the miss-distance, however, is not measured by the AN/USQ-11.

These measurement accuracies are further degraded for highperformance vehicles since high-g maneuvers and high-altitude operation introduce additional errors. Adverse visibility conditions can also seriously degrade optical measurement system performance.

Custom-designed systems, such as the WSMR Electronic Attitude and Vector Miss-Distance Measurement System (EAVMMS), have been developed to provide the required capability for new-generation, high-performance vehicles. The measurement requirements for the EAVMMS were developed from an assessment of the anticipated performance capabilities of the newgeneration vehicles. The system is based on multi-site angle and rangedifference measurements requiring missile-generated beacon signals. Target-borne scalar miss-distance radar (such as the AN/USQ-11A) provides the measurement of the distance of closest approach. The EAVMMS requires significant advances in the state of technology of time-delay stabilization and phase-detection to meet current specifications on performance.

In one form of implementation of a system for applying the IDFM techniques of this invention to the miss-distance or separation vector analysis problem, the interceptor or attack vehicle aimed at the target carries an on-board, low-power beacon transmitter. The transmitter provides a CW fixed-frequency signal for an IDFM/R system for measuring the target attitude and direction relative to the on-coming weapon. The part of the IDFM/R system on-board of the target consists of two crossed rectilinear sequences of receiving antenna elements. Each antenna element is connected momentarily, in succession, to one and the same down-converter for each sequence. The down-converters translate the frequencies received by the elements of each array to telemetry subchannel frequencies $f_1$ and $f_2$. The subchannel frequencies thus distinguish the receiving sequences, and when relayed to the ground via a telemetry link, they are processed by an IDFM tracking receiver to provide measurements of direction of approach and of the angle of inclination of the normal to the plane of the target-borne crossed arrays relative to the on-coming interceptor.

For the measurement of distance, speed of approach and recession and acceleration, either a two-station (on-board target) IDFM configuration is employed, or a miniradar is mounted on the target. The miniradar operates in a passive mode, requiring no transponder on the on-coming intercept vehicle. The radar signals were relayed to the ground via telemetry, where they are processed to derive the desired distance, relative velocity and relative acceleration data.

In an alternate arrangement, the crossed-sequence elements transmit rather than receive, beacon signals at different frequencies that identify the sequences. The signals are received on the on-coming interceptor and relayed back to the ground or to the target over a telemetry link. In this arrangement, the system operates in an IDFM/T mode to provide the desired direction of approach and miss-distance information.

In yet another arrangement (particularly suitable when the target does not provide a second sufficient dimension for a second rectilinear sequence or a second station) a circumferential (circular or other conic section) sequence of antenna elements is mounted on the target fuselage and operated in an IDFM/T or an IDFM/R mode.

In yet another implementation, the transmitting and the receiving antennas are both carried on the same target vehicle. The transmitting antenna (or antennas) illuminates a passive interceptor or other vehicle, and the receiver operates on the skin-reflected return from the illuminated object.

The separation or miss-distance vector can be determined relative to a ground-based coordinate system by augmenting the on-board system with a ground-based AXORD system for determining the orientation of the on-board coordinate system relative to the ground coordinate system.

The IDFM miss-distance or separation vector measuring system has the following significant advantages over an on-board laser or a similar optical system: (a) it is an all-weather system; (b) it performs simultaneous multiple weapon tracking; (c) it is not restricted in coverage to a limited sector or cross-section of the surrounding space; and (d) it has no pointing problem because of its nearly omnidirectional coverage.

The advantages of a combined ground-based and vehicle-borne IDFM system over ground-based optical cinetheodolite and similar systems are: (a) all-weather capability; (b) it provides the ability for tracking both the missile (weapon) and the target simultaneously; (c) multiple target tracking; (d) no pointing problems; (e) real-time data; and (f) no requirement for data extraction by reading films or film prints.

The IDFM position determination technique is particularly well-suited to off-shore and similar position determination applications. Specifically, in an off-shore position determination application, one way in which the system can be implemented is to place to IDFM/T stations at known positions on land with different operating frequencies distinguishing the different antenna lines of motion. A craft or a rig located offshore can determine its position relative to the shore reference coordinate system by measuring the frequencies associated with each line of motion and using the results to compute its own coordinates. It is important to note that the azimuth angles of the radials from the shore stations to the offshore craft or rig determine the radials along the surface, and the position to be determined at the intersection of these radials. This is particularly significant for beyond-the-horizon coverage at frequencies (such as 420 to 450 MHz) at which propagation behind the horizon is via such mechanisms as diffraction around the surface, reflection from a tropospheric inversion layer, tropospheric ducting or tropospheric scatter, or a combination of these mechanisms. The height of the reflecting or scattering boundary or body above the sea level will not affect the azimuth angle, nor will fluctuations in this height. Only lateral tilt in the reflecting boundary can cause errors in the azimuth angle.

Figure 5:
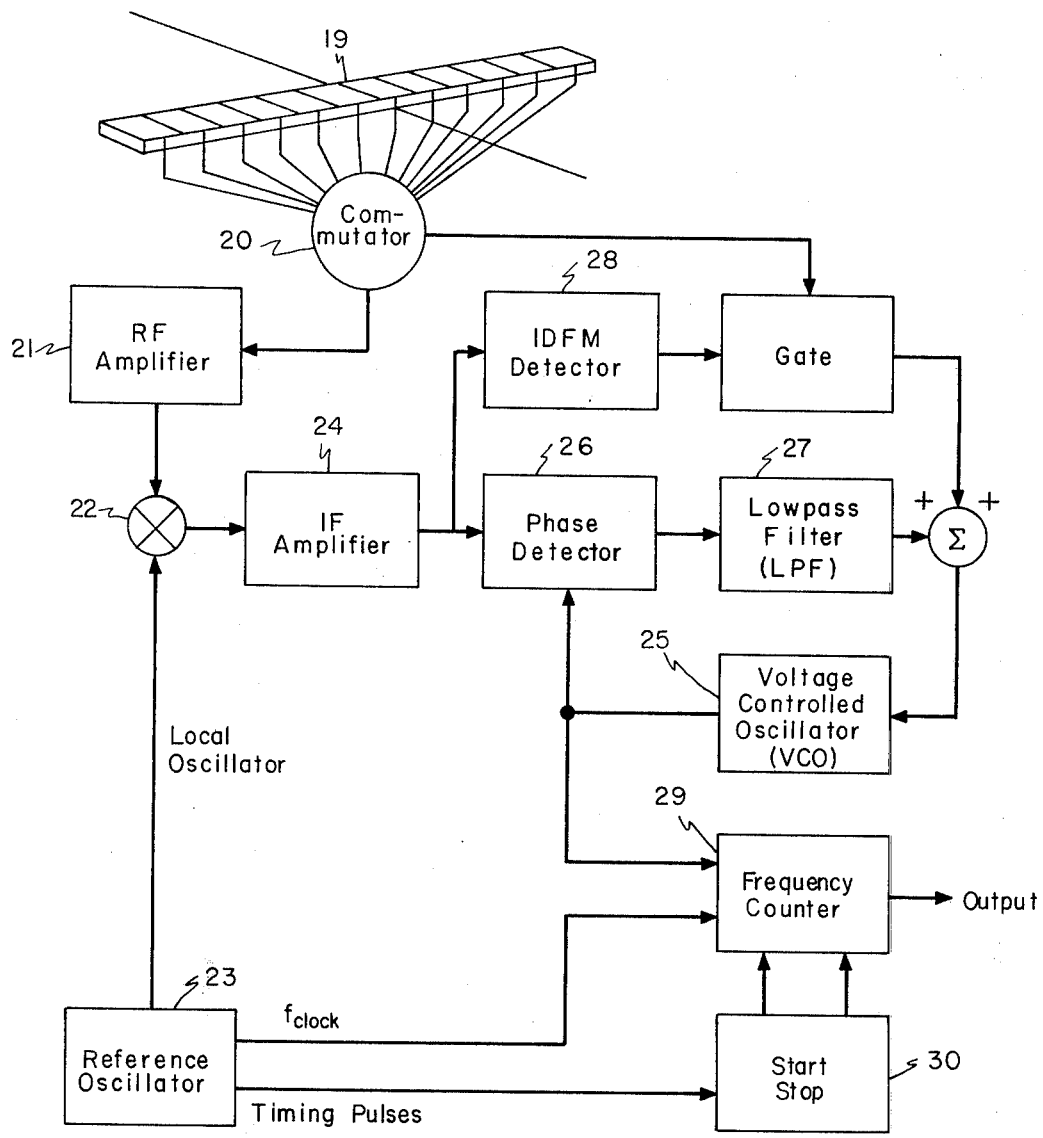
FIG. 5 shows a more detailed functional block diagram of one form of an IDFM tracking station receiving system including a distributor assembly for simulating a receiving antenna that moves along a recitilinear sequence of positions in accordance with this invention.

For a description of one form of an IDFM tracking receiver, reference is now made to FIG. 5. In this figure, 19 represents a sequence of receiving antennas arranged along a straight line, all connected to a commutator 20 which connects them sequentially to the input of RF Amplifier 21. In effect, the commutator sweeps the input of the receiver over the sequence of antennas in such a way as to simulate a receiving antenna in repeating motion at a uniform speed from one end of the line of antennas to the other, with a reversal of the sense of the motion as each end is reached. In a practical implementation, an RF amplifier such as 21 may be desired next to each antenna to amplify the antenna output prior to subjecting it to the loss and the associated degradation in noise figure in the cable connecting each antenna to the commutator. The output of RF Amplifier 21 is applied at the signal input of Mixer 22. The local oscillator input to Mixer 22 is provided by Reference Oscillator 23. IF Amplifier 24 provides both predetection filtering and amplification of all signals falling within the nominal RF bandwidth of the desired ensemble of signals for which the receiver is intended. The output of IF Amplifier 24 drives a phase-locked loop (PLL) intended to generate a signal at the output of VCO 25 whose frequency executes exactly the IDFM of the desired signal component in the input. Thus, the output of IF Amplifier 24 is applied to the phase-locked loop Phase Detector 26 to yield, after lowpass filtering by the loop LPF 27, the control signal that locks the VCO frequency (and phase) to the desired signal at each of its IDFM-shifted frequency values (the positive and the negative shifts shown in FIG. 2). The closed-loop bandwidth when locked to the current frequency and phase of the FM carrier component should preferably be in the order of 100 Hz or less, but the IDFM frequency shifts may be several kHz, even several tens of kHz in some applications. It is therefore generally necessary to provide a frequency acquisition aid to extend the locking range of the signal-tracking phase-locked loop and to enable the VCO 25 frequency to shift quickly to the new IDFM value after each frequency jump in the case of two-level (or multi-level) frequency-jump IDFM. This is accomplished in FIG. 5 by channeling the output of IF Amplifier 24 to a high-capture IDFM Detector 28 whose output is filtered to exclude all non-IDFM frequency fluctuations on the desired signal. The output of IDFM Detector 28 is a DC level proportional to the shift of the desired carrier frequency level from its would-be value in the absence of IDFM. This DC level is applied to VCO 25 for a small fraction of the half-period of the LOM sweep after a transition to a new IDFM shift value has occured. Gate 30 is opened up by timing pulses from Reference Oscillator 23 which occur at the instant the sense or the speed of the sweep along the antenna line of motion is changed. As soon as the VCO 25 frequency is shifted to the new value, Gate 30 disconnects the output of IDFM Detector 28, thus preventing the noise present in this output (in a bandwidth that must be much larger than the closed-loop bandwidth in order not to round-off the detected IDFM steps) from degrading the VCO 25 signal quality. Alternatively, the PLL's are used, each manually or automatically tunable to lock to the IDFM signal at one of its shifted frequencies, and to maintain that lock over a wide range of changes in the value of the frequency shift.

Thus, with the frequency shifts of VCO 25 accurately matched to the IDFM shifts of the desired signal carrier component, the IDFM on the desired signal can be measured by Frequency Counter 29. If a digital PLL is used, an automatic count can be read out of the VCO without a special, separate frequency counter.

In yet another variation on the basic invention described herein, each line of motion or each line of antennas in all of the preceding discussions is swept in both directions simultaneously, or is replaced by two parallel lines, one next to the other, to create or simulate a radiating source or a receiver moving relative to its platform in two opposite directions at the same time with the same or with different speeds. This creates in the receiver two frequency-shift modulated signals differing in frequency (at all but the instants corresponding to the occurrences of the frequency jumps) by a constant frequency proportional to $\cos \alpha \cos \theta$ for one orientation of the lines (say, N-S) and $\cos \alpha \sin \theta$ for the orthogonal orientation (E-W). This frequency difference will be of the same sign and can, if desired, be counted directly, rather than determined as the difference between separately counted frequencies. In such a case, two phase-locked loops, each locked to one of the two frequencies, are used in place of the one shown in FIG. 5, both driven from the output of IF Amplifier 24, and acquisition-aided initially or as needed by IDFM Detector 28. Frequency Counter 29 can then be switched back and forth between the outputs of the two VCO's, or two frequency counters can be used, one for each VCO. In this way, continuous measurements of peak-to-peak frequency jumps and of the average (or operating) frequency $f_o$, can be performed, and the need for PLL re-acquisition prior to each frequency measurement can be eliminated.

Figure 6:
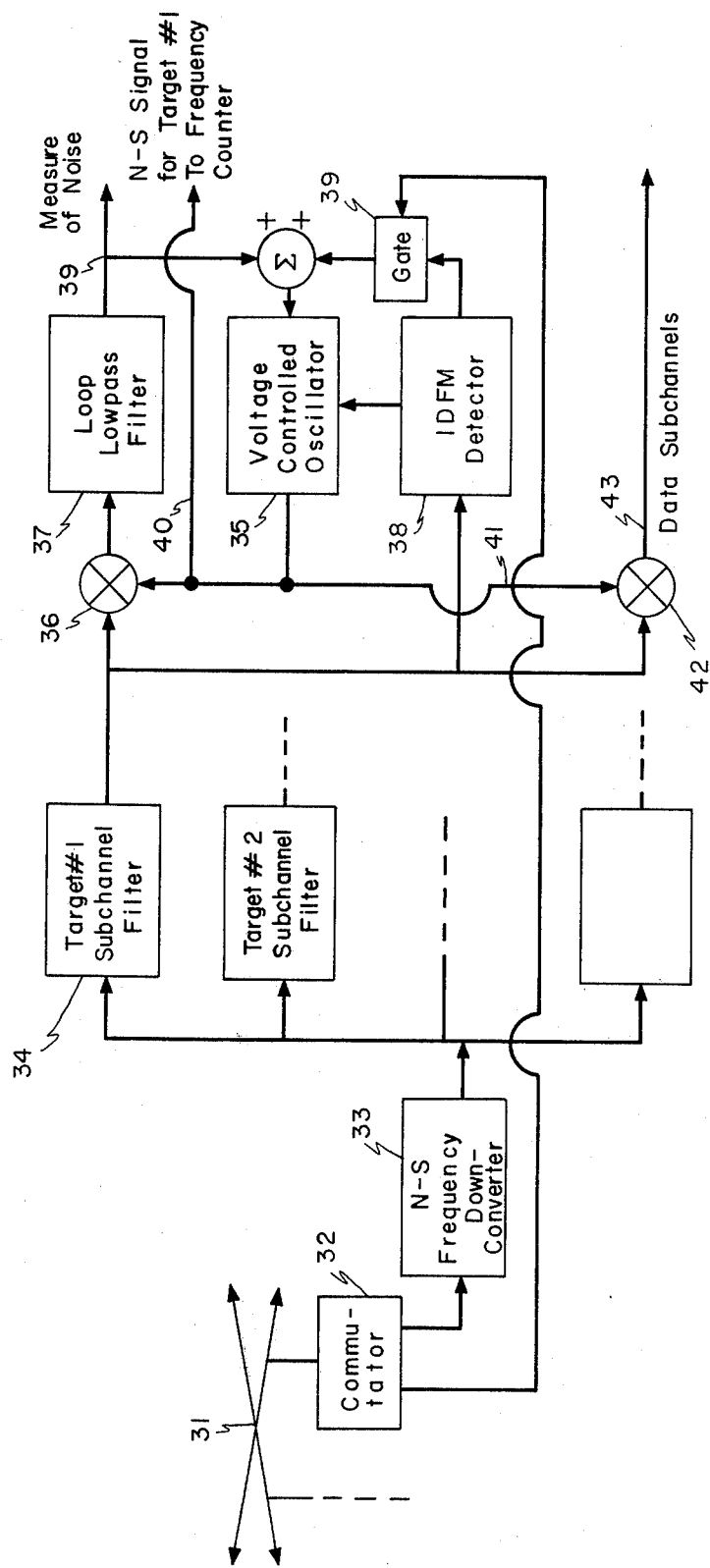
FIG. 6 shows a more detailed block diagram of one form of an IDFM receiver including, in addition, an arrangement for extracting telemetry or other non-tracking information from the received signal in accordance with this invention.

One form of an IDFM/R tracking receiver for tracking a multiplicity of targets is illustrated in FIG. 6. In this figure two antenna LOM's 31, N-S and E-W, are shown. Each line is coupled via a Commutator 32 to the input of a corresponding Frequency Down-Converter 33, which in turn drives a bank of Target Subchannel Filters 34. In such an implementation, it is assumed that the available frequency band is subdivided into subchannels each of which is assigned to a different target. Each target then radiates a signal at the center frequency of its assigned subchannel, and this signal acquires IDFM by the action of Commutator 32. The output of each Target Subchannel Filter is applied to the Phase Detector 36 of a PLL acquisition-aided by a gated IDFM Detector 38. Alternatively, two PLL's are used, one locked to each frequency of the IDFM signal, acquisition-aided as needed by gated IDFM Detector 38. Data subchannels carried by PCM/$\phi$M on the target subchannel signal can be extracted either from the output of phase detector 36 prior to filtering by Loop Lowpass Filter 37, or by means of a separate phase detector 42.

While there has been described what is at present considered representative embodiments of the invention, it will be obvious to those skilled in the art that various changes and modifications may be made therein without departing from the invention, and it is aimed in the appended claims to cover all such changes and modifications as fall within the true spirit and scope of the invention.

what is claimed is:

1. A method of determining position coordinates of an object relative to a reference coordinate system, comprising the steps of:
 radiating carrier waves from a radiating position at one of said object and a station having a known location in said reference coordinate system;
 receiving the carrier waves at a receiving position at the other of said object and said station;
 varying the location of at least one of said radiating and said receiving positions in a first predetermined manner and a second predetermined manner, different from the first;
 measuring the frequency of the received carrier waves when the location of the one of said radiating and receiving positions is varied in the first predetermined manner;

measuring the frequency of the received carrier waves when the location of the one of said radiating and receiving positions is varied in the second predetermined manner; and determining a position coordinate of the object responsive to a difference between the measured frequencies of the received carrier waves.

2. The method of claim 1 wherein the varying of the location of at least one of said radiating and said receiving positions is effected repetitively and wherein said predetermined paths are two non-parallel paths.

3. The method of claim 1 wherein:

the carrier waves are transmitted by a transmitter;

the carrier waves are radiated by reflection from the object; and, the reflected carrier waves are received by at least one antenna, having a known location on the coordinate system, at at least one receiving position on the antenna, the location of which position is repetitively varied along the predetermined paths.

4. The method of claim 1 wherein:

the carrier waves are transmitted by a transmitter;

the carrier waves are received by the object and retransmitted; and, the retransmitted carrier waves are received by at least one antenna, having a known location on the coordinate system, at at least one receiving position on the antenna, the location of which position is repetitively varied along the predetermined paths.

5. The method of claim 1 wherein:

the carrier waves are radiated from the object by a transmitter on the object; and, the radiated carrier waves are received by an antenna, having a known location on the coordinate system, at at least one receiving position on the antenna, the location of which receiving position is repetitively varied along the predetermined paths.

6. The method of claim 1 wherein:

the carrier waves are radiated by a transmitter, having a known location on the coordinate system; and, the radiated carrier waves are received by the object, at at least one receiving position, the location of which receiving position is repetitively varied along the predetermined paths.

7. The method of claim 6 wherein the carrier waves are radiated by a plurality of transmitters, each having a known location in the coordinate system.

8. The method of claim 1 wherein:

the carrier waves are radiated by reflection from the object at at least one radiating position on the object; and, the carrier waves are received by an antenna, said antenna having a known location on the coordinate system; and, wherein the location of at least one of the radiating positions is repetitively varied along the predetermined paths.

9. The method of claim 1 wherein:

the carrier waves are radiated by a transmitter, having a known location on the coordinate system, from at least one radiating position the location of which is repetitively varied along the predetermined paths.

10. The method of claim 1 wherein the position coordinates of the object which are determined are the elevational angle and azimuthal angle.

11. The method of claim 1 wherein the location of at least one of said radiating and said receiving positions is varied by reciprocating motion at a generally uniform speed along non-parallel straight lines.

12. An apparatus for determining the location of a station in a reference coordinate system comprising:

at least two antenna means in the locality of the station, for receiving the carrier waves, each antenna means having at least one carrier wave receiving position which moves repetitively with a uniform speed so that carrier waves are received along at least two non-parallel lines;

means for radiating carrier waves to said receiving antenna means from a known location in the reference coordinate system; and, means, communicating with said antenna means, for determining the location of the station with respect to the reference coordinate system responsive to frequency modulations of the carrier waves induced by the movements of the receiving positions.

13. An apparatus for determining position coordinates of an object comprising:

first means for radiating carrier waves from a radiating position;

antenna means for receiving carrier waves from the object at a receiving position of the antenna means;

means for varying the location of one of said radiating and receiving positions in a first predetermined manner and a second predetermined manner, different from the first, thereby inducing two different Doppler frequency shifts in the carrier waves; and, means for determining position coordinates of the object responsive to a difference between the frequency of the received carrier waves when the location is varied in the first predetermined manner and the frequency when the location is varied in the second predetermined manner.

14. The apparatus of claim 13 further comprising:

a second radiating means, spaced a known distance from the first radiating means, for radiating carrier waves from an additional radiating position; and, wherein said varying means periodically varies the locations of the radiating positions of said first and said second radiating means along at least two predetermined non-parallel paths.

15. The apparatus of claim 14 wherein the locations of said radiating positions are each varied by repetitive motion and wherein the paths are at least two non-parallel straight lines.

16. The apparatus of claim 15 wherein the paths are three straight lines not all lying in the same plane.

17. The apparatus of claim 13 wherein said radiating means is located on said object and the radiating position moves on the object with a uniform velocity;

wherein said antenna means includes at least three spatially separated, non-colinearly positioned antennas; and, wherein said determining means determines the orientation, with respect to the reference coordinate system of the antenna means, an axis of the object generally parallel to a direction of movement of the said radiating position of said radiating means with respect to the object.

18. The apparatus of claim 13 further comprising means for directing the carrier waves around an obstruction lying between said radiating means and said antenna means.

19. The apparatus of claim 13 wherein the object is a projectile and the radiating means and antenna means are located on a target.

20. The apparatus of claim 19 wherein said apparatus further comprises radar means on said target for determining the distance between the projectile and the target.

21. The apparatus of claim 19 further comprising a second radiating means spaced on said target a known distance from said first radiating means, for radiating carrier waves from an additional radiating position.

22. An apparatus for determining position coordinates of an object comprising:
- a first transmitter for transmitting first carrier waves from at least one position moving repetitively at a generally uniform speed along at least two non-parallel lines, whereby frequency modulation is induced by the Doppler effect in said transmitted first carrier waves;
- a second transmitter, displaced a known distance from said first transmitter, for transmitting second carrier waves from at least one position moving repetitively at a generally uniform speed along at least two non-parallel lines, whereby frequency modulation is induced by the Doppler effect in said transmitted second carrier waves;
- antenna means for receiving said first and second carrier waves directed by the object to said antenna means; and,
- means operatively connected to said antenna means for determining the position coordinates of the object with respect to said transmitters, responsive to the induced frequency modulation of the received first and second carrier waves.

23. The apparatus of claim 22 wherein said first and second transmitters each include a first radiating element moved along a first line of motion and a second radiating element moved along a second line of motion non-parallel to the first line of motion.

24. The apparatus of claim 22 wherein said first and second transmitters each include an arrangement of radiating elements, commutated to move the point of radiation of carrier waves along the two non-parallel lines.

25. The apparatus of claim 22 further comprising:
- a third transmitter located at a known position with respect to said first and second transmitters, which transmits a signal directed by the object and received by said antenna means; and,
- means for determining the velocity vector of the object responsive to the induced frequency modulations of the received first and second carrier waves and the received signal from said third transmitter.

26. The apparatus of claim 22 wherein said first tranmitter transmits the first carrier wave from at least one position moving along three mutually non-parallel non-coplanar lines.

27. An apparatus for determining the position coordinates of an object comprising:
- a first means for radiating carrier waves;
- a first antenna means for receiving carrier waves directed by the object at at least one position on said first antenna means which position moves repetitively at a generally uniform speed along at least two non-parallel lines, whereby frequency modulation is induced in said received carrier waves;
- a second antenna means, displaced a known distance from said first antenna means, for receiving carrier waves directed by the object at at least one position on said second antenna means which position moves repetitively at a generally uniform speed along at least two non-parallel lines, whereby frequency modulation is induced in said received carrier waves; and,
- means operatively connected to said first and second antenna means for determining the position coordinates of the object with respect to said antenna means, responsive to the induced frequency modulation of the received carrier waves.

28. The apparatus of claim 27 wherein said first and second antenna means each comprise a first antenna moved along a first line of motion and a second antenna moved along a second, non-parallel line of motion.

29. The apparatus of claim 27 wherein said first and second antenna means each comprise an arrangement of receiving elements, commutated to move the point of reception of the carrier waves along two non-parallel lines at a generally uniform speed.

30. The apparatus of claim 27 further comprising:
- a third antenna means, located at a known position with respect to said first and second antenna means, for receiving the carrier waves directed by the object; and
- means for determining the velocity vector of the object responsive to the induced frequency modulation of the carrier waves received by said first and said second antenna means and responsive to Doppler shift of the carrier wave received by said third antenna means.

31. The apparatus of claim 27 wherein said first antenna means receives the carrier wave at at least one position moving along three mutually non-parallel, non-coplanar straight lines.

32. The method of claim 1 wherein the location of the radiating position is varied and further comprising the steps of:
- radiating carrier waves from another radiating position at the one of said object and said station; and
- varying the location of said another radiating position in a first predetermined manner and a second predetermined manner, different from the first, thereby inducing two different Doppler frequency shifts in the carrier waves, the location of said another radiating position being varied along a path non-parallel to a path along which the other radiating position is varied; and,
- wherein position coordinates of the object are determined responsive to the frequency of the carrier waves received from both radiating positions.

33. The method of claim 32 wherein the position coordinates of the object are determined by:
- determining a first difference between the frequency of the carrier waves received from said another radiating position when the location is varied in the first predetermined manner and the frequency when the location is varied in the second predetermined manner;
- determining a first difference between the frequency of the carrier waves received from said another radiating position when the location is varied in the first predetermined manner and the frequency when the location is varied in the other predetermined manner; and, determining position coordinates of the object responsive to said determined differences.

34. The method of claim 1 wherein the location of the receiving position is varied and further comprising the steps of:

receiving carrier waves at another receiving position at the one of said object and said station; and varying the location of said another receiving position in a first predetermined manner and a second predetermined manner, different from the first, thereby inducing two different Doppler frequency shifts in the carrier waves, the location of said another receiving position being varied along a path at least partially non-parallel to a path along which the other receiving position is varied; and, wherein position coordinates of the object are determined responsive to the frequency of the carrier waves received at both receiving positions.

35. The method of claim 34 wherein the position coordinates of the object are determined by:

determining a first difference between the frequency of the carrier waves received at said another receiving position when the location is varied in the first predetermined manner and the frequency when the location is varied in the second predetermined manner;

determing a first difference between the frequency of the carrier waves received at said another receiving position when the location is varied in the first predetermined manner and the frequency when the location is varied in the other predetermined manner; and, determining position coordinates of the object responsive to said determined differences.

36. The method of claim 1 wherein the location of the one of said radiating and receiving positions is varied in the first and second predetermined manners by repetitively moving the position back and forth along a straight line.

37. The method of claim 36 wherein the position coordinate of the object is determined by averaging the frequencies of the received carrier waves to determine the unshifted frequency of the carrier waves; calculating upward and downward shifts in the frequency of the carrier waves from the unshifted frequency of the carrier waves due to the varying of the location of the one of said radiating and receiving positions; and calculating the position coordinate of the object responsive to the calculated upward and downward shifts in the frequency of the carrier waves.

38. The method of claim 37 wherein the position coordinate of the object is determined responsive to the ratio of the calculated upward and downward shifts in the frequency of the carrier waves.

39. The method of claim 1 wherein the location of the one of said radiating and receiving positions is varied in the first and second predetermined manners by moving the position at two different speeds along a straight line.

40. The apparatus of claim 13 wherein said location varying means varies the location of the one of said radiating and receiving positions in the first and second predetermined manners by repetitively moving the position back and forth along a straight line.

41. The apparatus of claim 23 wherein said location varying means varies the location of the one of said radiating and receiving positions in the first and second predetermined manners by moving the position at two different speeds along a straight line.

42. A method of determining the position of an object relative to known reference location, comprising the steps of:

radiating carrier waves from along two at least partially non-parallel lines at one of the object and the known reference location by varying the location of at least one radiating position to induce Doppler shift in the carrier waves;

receiving the carrier waves at at least two antennae spaced apart at the other of the object and the known location;

sensing the Doppler shift of the carrier waves received at each of the antennae; and, calculating the position of the object from the sensed Doppler shifts, the separation of the two antennae and the coordinates of the known reference location.

43. An apparatus for determining position coordinates of an object comprising:

first means for radiating carrier waves from a radiating position;

antenna means for receiving carrier waves directed by the object to a receiving position;

means for varying in a predetermined manner the location of one of said radiating and receiving positions, thereby inducing at least two separate independent frequency modulations in the carrier waves each of which is dependent at least in a partially separate and independent manner on the position coordinates of the object;

means for separately determining each of the induced independent frequency modulations of the received carrier waves; and, means for determining position coordinates of the object responsive to the induced independent frequency modulations of the received carrier waves.

* * * * *